United States Patent
Brondijk et al.

(10) Patent No.: US 8,407,415 B2
(45) Date of Patent: Mar. 26, 2013

(54) DE-ICING OF MULTI-LAYER STORAGE MEDIA

(75) Inventors: Robert Albertus Brondijk, Eindhoven (NL); Jakob Gerrit Nijboer, Eindhoven (NL); Pope Ijtsma, Eindhoven (NL); Paulus Gijsbertus Petrus Weijenbergh, Eindhoven (NL); Johannes Hendrikus Maria Spruit, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 824 days.

(21) Appl. No.: 12/096,188

(22) PCT Filed: Dec. 1, 2006

(86) PCT No.: PCT/IB2006/054543
§ 371 (c)(1),
(2), (4) Date: Jun. 5, 2008

(87) PCT Pub. No.: WO2007/066263
PCT Pub. Date: Jun. 14, 2007

(65) Prior Publication Data
US 2008/0310278 A1      Dec. 18, 2008

(30) Foreign Application Priority Data
Dec. 6, 2005  (EP) .................................... 05301012

(51) Int. Cl.
*G06F 12/00*  (2006.01)
*G11B 7/0037*  (2006.01)
*G11B 7/007*  (2006.01)
*G06F 12/02*  (2006.01)
*G11B 7/242*  (2006.01)

(52) U.S. Cl. ................. 711/112; 711/209; 711/E12.001; 369/94; 369/275.2; 369/275.3

(58) Field of Classification Search ........................ None
See application file for complete search history.

(56) References Cited

U.S. PATENT DOCUMENTS 6,151,281 A     11/2000  Van Der Enden
6,538,982 B1     3/2003  Van Vlerken et al.
(Continued)

FOREIGN PATENT DOCUMENTS

EP    1564741 A1   8/2005
EP    1710800 A2  10/2006
(Continued)

OTHER PUBLICATIONS

International Search Report of International Application No. PCT/IB2006/054543 Contained in International Publication No. WO2007066263, Jul. 5, 2007.
(Continued)

*Primary Examiner* — Jasmine Song
*Assistant Examiner* — Daniel Bernard

(57) ABSTRACT

A device for recording information on a record carrier (11) is arranged for formatting a multilayer record carrier. The device has formatting means (16) for formatting the record carrier according which formatting includes de-icing by, in the event that locations in the user data area have not yet been recorded, writing dummy data (60) on the locations. The formatting means (16) determine a first radial position (50) and a first layer (40), which first radial position is indicative of a location on the first layer on which user data will be recorded first according to a predefined recording format. Subsequently said de-icing is started by writing of dummy data on a second layer (41) of the record carrier at the first radial position, opposite the location of the first user data (55). Hence a de-iced area (58) is created opposite the user data (55).

9 Claims, 5 Drawing Sheets

U.S. PATENT DOCUMENTS

| | | | |
|---|---|---|---|
| 6,876,612 B2 * | 4/2005 | Yoneyama et al. | 369/47.55 |
| 2003/0081525 A1 * | 5/2003 | Yoneyama et al. | 369/59.25 |
| 2004/0095812 A1 | 5/2004 | Yoshimura et al. | |
| 2004/0156294 A1 | 8/2004 | Watanabe et al. | |
| 2005/0002308 A1 | 1/2005 | Tanaka | |
| 2005/0030873 A1 * | 2/2005 | Sasaki | 369/59.25 |
| 2005/0042545 A1 | 2/2005 | Tieke et al. | |
| 2006/0120238 A1 * | 6/2006 | Sasaki | 369/47.1 |
| 2006/0198265 A1 * | 9/2006 | Sasaki | 369/53.24 |
| 2006/0239168 A1 * | 10/2006 | Shoji et al. | 369/94 |
| 2006/0274626 A1 | 12/2006 | Kawashima et al. | |
| 2007/0076554 A1 | 4/2007 | Sasaki | |
| 2008/0152323 A1 * | 6/2008 | Hora | 386/126 |
| 2008/0219124 A1 * | 9/2008 | Matsuba | 369/94 |

FOREIGN PATENT DOCUMENTS

| | | | |
|---|---|---|---|
| EP | 1758117 A2 | 2/2007 | |
| JP | 2005093032 A | 7/2005 | |
| JP | 2005243203 A | 8/2005 | |
| JP | 2006338770 A | 12/2006 | |
| WO | WO9816014 A1 | 4/1998 | |
| WO | WO2004042717 A1 | 5/2004 | |
| WO | 2004100159 A1 | 11/2004 | |
| WO | WO2004100159 A1 | 11/2004 | |
| WO | 2005020231 A2 | 3/2005 | |
| WO | 2005020232 A2 | 3/2005 | |
| WO | WO2005020231 A2 | 3/2005 | |
| WO | WO2005020232 A2 | 3/2005 | |
| WO | 2005043539 A2 | 5/2005 | |
| WO | WO2005043539 A2 | 5/2005 | |

OTHER PUBLICATIONS

Written Opinion of the International Searching Authority for International Application No. PCT/IB2006/054543, Jul. 5, 2007.

"Double Layer DVD+R Multi-Media Command Set Description, Version 1.00"; Internet Citation [Online], Jun. 4, 2004, Retrieved From the Internet: URL:http://www.t10.org/ftp/t10/document.04/04-180r0.pdf>.

"Double Layer DVD+R Multi-Media Command Set Description, Version 1.00", XP002386267, Jun. 4, 2004.

"Informationa Technology—Multimedia Commands MMC-5", Draft Proposal of the National Committee for Information Technology Standards (NCITS), Working Draft, T10/1675-D, Revision 1, Oct. 2004.

* cited by examiner

DE-ICING OF MULTI-LAYER STORAGE MEDIA

FIELD OF THE INVENTION

The invention relates device for recording information on a record carrier, the record carrier being of an optically rewritable type, and the device comprising scanning means for scanning the record carrier for recording and retrieving data on a layer of the record carrier, and formatting means for formatting the record carrier according to a predefined recording format that defines a user data area, which formatting includes de-icing by, in the event that locations in the user data area have not yet been recorded, writing dummy data on the locations.

The invention further relates to a method of formatting a record carrier for recording data and retrieving data, the record carrier being of an optically rewritable type, and the method comprising formatting the record carrier according to a predefined recording format that defines a user data area, which formatting includes de-icing by, in the event that locations in the user data area have not yet been recorded, writing dummy data on the locations.

The invention further relates to a computer program product for formatting the record carrier.

BACKGROUND OF THE INVENTION

A device and method for recording an optical record carrier are known from U.S. Pat. No. 6,151,281. The record carrier has a pre-track pattern constituted by a guide groove, usually called pregroove, for indicating the position of tracks in which the information is to be recorded. The information is encoded according to a predefined recording format (for example DVD, Digital Versatile Disc) and represented by recording optically readable marks. The pregroove is meandering by a periodic excursion of the track in a transverse direction (further denoted as wobble). The wobble may be varied in period according to additional information such as addresses. A recording device is provided with a head for generating a beam of radiation for scanning the track and writing the marks. At first use a blank record carrier is provided with a predefined amount of control data to indicate the status of the record carrier. Further some data may be recorded in the recording area, for example file system information. Initializing the record carrier as indicated is usually called formatting.

When the record carrier is to be read in a playback device designed for prerecorded discs, such a playback device will, according to the predefined recording format, expect a fully recorded disc, in particular not containing blank areas. Such blank, unrecorded areas are usually called 'ice', because a playback device that cannot detect the pregroove will loose control when trying to read an 'iced' area. In the US document a method of formatting the record carrier is described, in which a contiguously written area is created starting from the beginning of the recording area, usually called de-icing.

Currently recordable multilayer record carriers are being developed. On a multilayer record carrier each layer has its own annular data zone, while the annular data zones together may constitute a single logical data storage space. For example on a dual layer record carrier, on the first layer the annular data zone starts with the lead-in zone, and is terminated by a middle control zone. The second layer then starts with a middle control zone, and is terminated by the lead-out control zone.

However, de-icing record carriers according to the above US document takes a considerable amount of time, which is annoying to the user who starts using the record carrier. The document does not provide a method of de-icing for multilayer record carriers.

SUMMARY OF THE INVENTION

Therefore it is an object of the invention to provide a device and method for formatting a record carrier of a multilayer type for preventing delays when the record carrier needs to be formatted and prepared for use in a playback device.

According to a first aspect of the invention the object is achieved with a device for recording information as described in the opening paragraph, the formatting means being arranged for de-icing a multilayer record carrier by determining a first radial position and a first layer, which first radial position is indicative of a location on the first layer on which user data will be recorded first according to the predefined recording format, and starting said writing of dummy data on a second layer of the record carrier at the first radial position.

According to a second aspect of the invention the object is achieved with a method for formatting a record carrier as described in the opening paragraph, in which method the formatting includes de-icing a multilayer record carrier by determining a first radial position and a first layer, which first radial position is indicative of a location on the first layer on which user data will be recorded first according to the predefined recording format, and starting said writing of dummy data on a second layer of the record carrier at the first radial position.

The effect of the measures is that the formatting now includes effective de-icing for a multilayer record carrier. In particular, the part of the record carrier that is de-iced first is part of said second layer of the multilayer record carrier, which part corresponds to a part of the first layer where user data is recorded first. Advantageously, such a partly de-iced multilayer record carrier can be used in a read-only type player without the risk that such player would accidentally scan a still blank area of the record carrier.

The invention is also based on the following recognition. When considering multilayer record carriers, the recording area on different layers may be formatted according to a predefined recording format, for example DVD or BD. In such recording formats, the available recording space on each of the layers is either combined to a singular, logically contiguous, user data area, or formatted as independent user data areas on each layer. Traditionally, when formatting a record carrier, the available recording space is formatted to a data area, having a lead-in area preceding the data area and a lead-out are at the end. As explained in the introduction with reference to U.S. Pat. No. 6,151,281, the formatting may include de-icing, i.e. writing dummy data starting at a radial position adjacent to the last written area in the direction of the track towards the lead-out area. The inventors have seen that, when applying the traditional de-icing to a multilayer record carrier, this would result in first completely de-icing the first layer, and subsequently de-icing further layers by writing dummy data in a direction towards the lead-out area. However, physically a blank part of layers, opposite to already recorded user data on the first layer, provides a risk when such record carrier is rendered in a player that is not capable of correctly handling blank layers, such a read-only player. Such an incapable player might accidentally focus on a different layer, while trying to access the already recorded data on the first layer. The inventors provided a solution that reduces the risk for not fully de-iced multilayer record carriers by proposing the order and sequence of writing dummy data as in the current invention.

The inventors have noted that WO 2005/0020232 describes a method for recording information on a multilayer record carrier. In the method, user data is recorded substantially evenly distributed over the layers in blocks of a predetermined amount of storage space. However, the document does not suggest a de-icing method as currently invented. On the contrary, for accommodating read-only players, the document proposes to evenly distribute the user data files similarly to a read-only record carrier that has recorded areas on corresponding radial areas.

Finally the inventors have noted that some recording devices suitable for write once dual layer storage media have appeared on the market. However, such recorders obviously are not concerned with de-icing, as such de-icing is not applicable to write-once record carriers.

In an embodiment of the device, for accommodating the multilayer record carrier comprising at least a first layer and a second layer, and the track on the first layer extending in a first direction and the track on the second layer extending in a second direction opposite to the first direction for constituting the user data area having a first part on the first layer, and a second part on the second layer, the formatting means are arranged for said de-icing by determining, as said first radial position, a location adjacent to a starting area preceding said first part in the first direction, and writing said dummy data in dummy units, a first dummy unit being recorded on said second layer at a location adjacent to a terminating area following said second part in the second direction. This has the advantage that said first radial position is a fixed position, and the first layer for recording user data is a fixed layer, that are derived from the predefined recording format. Therefore the location for starting the writing of the dummy data is also fixed, which easily allows de-icing the multilayer having opposite track direction on different layers. In a further embodiment of the device the formatting means are arranged for said de-icing by writing subsequent dummy units after the first dummy unit on said second layer at a sequence of adjacent positions adjacent to the first dummy unit, the sequence of adjacent positions having a direction opposite to the second direction. Hence the sequence is recorded in a direction opposite to the track direction of the respective layer being de-iced.

In an embodiment of the device the formatting means are arranged for said de-icing by determining a second radial position on the first layer, which second radial position is indicative of a boundary radial position up to which, on the first layer, user data will be recorded according to the predefined recording format, and writing dummy data on the second layer of the record carrier from the first radial position up to the second radial position. This has the advantage that the second layer will be de-iced first, while, in the mean time, data may be recorded on the first layer.

In an embodiment of the device the formatting means are arranged for said de-icing by determining a third radial position on the first layer, which third radial position is indicative of an intermediate radial position up to which, on the first layer, user data has already been recorded, writing dummy data on the second layer of the record carrier from the first radial position up to the third radial position, and subsequently writing dummy data on a location on the first layer adjacent to said third radial position. This has the advantage that de-icing starts with an area of the second layer opposite the part of the first layer that already contains user data, and continues with de-icing the first layer adjacent to the recorded user data. This prevents the above incapable player from touching a blank area on the first layer immediately following the recorded user data.

In an embodiment of the device the formatting means are arranged for said de-icing by writing said dummy data in dummy units, subsequent dummy units being recorded alternatingly on said first layer and on at least one further layer at a sequence of locations adjacent to preceding dummy units, the sequence on each layer having the same radial direction. It is to be noted that any of the above embodiments may be used for a multilayer record carrier having three or more layers. In the current embodiment dummy data is written at similar radial positions on every layer that is blank. Hence de-icing takes place on every layer. Subsequently de-icing progresses to a next radial position in the same direction, i.e. the direction of writing user data on the first layer.

Further preferred embodiments of the method and device according to the invention are given in the further claims.

BRIEF DESCRIPTION OF THE DRAWINGS

These and other aspects of the invention will be apparent from and elucidated further with reference to the embodiments described by way of example in the following description and with reference to the accompanying drawings, in which.

In the Figures, elements which correspond to elements already described have the same reference numerals.

DESCRIPTION OF THE PREFERRED EMBODIMENTS

Figure 1:
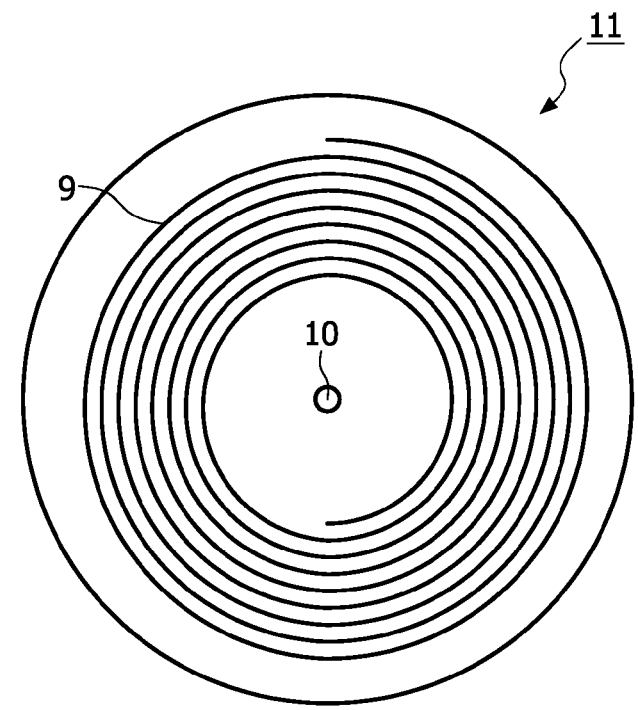
FIG. 1 shows a disc-shaped record carrier.

FIG. 1 shows a disc-shaped record carrier 11 having a track 9 and a central hole 10. The track 9 is arranged in accordance with a spiral pattern of turns constituting substantially parallel tracks on an information layer. The record carrier may be an optical disc having an information layer of a recordable type. Examples of a recordable disc are the CD-R and CD-RW, and the DVD+RW. The track 9 on the recordable type of record carrier is indicated by a pre-track structure provided during manufacture of the blank record carrier, for example a pregroove. Recorded information is represented on the information layer by optically detectable marks recorded along the track. The marks are constituted by variations of a first physical parameter and thereby have different optical properties than their surroundings. The marks are detectable by variations in the reflected beam, e.g. variations in reflection.

During scanning a blank record carrier the pre-track pattern, for example including the wobble modulation, is detectable via a further type of variations of the radiation, such as variation of intensity in the cross section of the reflected beam detectable by detector segments or additional detectors for generating tracking servo signals. Using a wobble for a tracking servo system is well known from the CD-R/RW and DVD+RW system. The wobble modulation is used to encode physical addresses and control information, for example as described in U.S. Pat. No. 6,538,982.

The record carrier may be intended to carry real-time information, for example video or audio information, or other information, such as computer data.

The system of recording information according to the invention relates to a multilayer record carrier having at least two layers recordable from the same side of the record carrier. In DVD the first layer (L0, indicating the layer being first in a logical recording order) is located at a position closer to the entrance face than the second layer (L1). It is noted that usually the 'first' layer is a layer closer to the entrance face of the laser, and 'second' indicates a layer farther away from the entrance face of the laser.

Due to the required compatibility with existing read-only standardized record carriers, like the DVD-ROM standard, for a DVD-type dual-layer recordable (or rewritable) disc there are two options possible for the layout of the disc. These two options are referred to as 'parallel track path' (PTP) and 'opposite track path' (OTP), which indicates the direction of the spiral in both layers. In PTP discs there is one information zone per layer (which may logically be combined to a single addressable space), while in OTP discs the information zone has a first part on the first layer (L0) and a second part on the second layer (L1). In the DVD ROM standard for dual-layer discs in opposite-track-path (OTP) mode, a single information zone is defined extending over the two layers.

Figure 2:
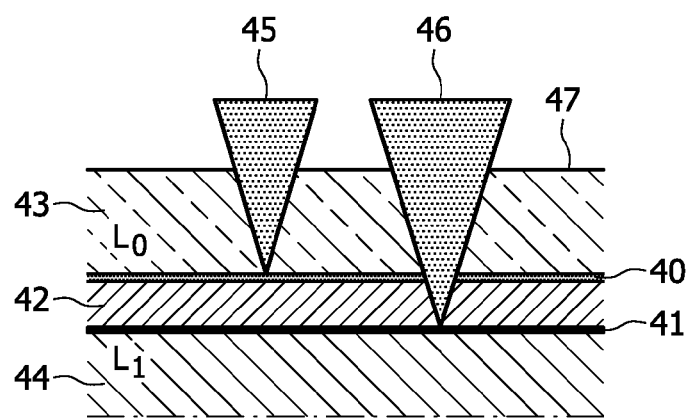
FIG. 2 shows a multilayer optical disc.

FIG. 2 shows a multilayer optical disc. L0 is a first layer 40 and L1 is a second layer 41. A first transparent layer 43 covers the first layer, a spacer layer 42 separates both layers 40,41 and a substrate layer 44 is shown below the second layer 41. The first layer 40 is located at a position closer to an entrance face 47 of the record carrier than the second layer 41. A laser beam is shown in a first state 45 focused on the L0 layer and the laser beam is shown in a second state 46 focused at the L1 layer.

Multilayer discs are already available as read-only prerecorded discs, such as DVD-ROM or DVD-Video. Also writable dual-layer discs are known. A dual layer DVD+RW disc has recently been proposed, which disc is to be compatible with the dual layer DVD-ROM standard. The L0 layer has a transmission around 40-60%. The effective reflection of both layers is typically 7% although lower and higher values are possible (3%-18%). Writable and rewritable optical storage media having 3 or more layers are considered also.

DVD+RW DL is a dual layer DVD+RW disc. Like a single layer disc, both layers are totally unwritten when it comes out of the production line. Unwritten areas on a disc are referred to as "ICE" because a normal optical drive that is only capable of reading DVD-ROM discs will see the blank layer as a flat surface and not be able to track on it. In order for such a limited capability drive to track on a rewritable disc, a drive, which is capable to write on a DVD+RW disc, must write data to it. Written areas on a rewritable disc are also referred to as "De-ICED" areas. Once a single layer disc is written from its lead-in to its lead-out, then a drive that is only capable of reading a DVD-ROM has no problem reading the disc.

Double or multi-layered rewritable discs have an added compatibility problem with DVD-ROM drives above a single layer. That is that a DVD-ROM drive can inadvertently jump to any of the layers. This implies that if a multilayer where use used in such a drive, that is, that only a single layer is written completely, then a DVD-ROM player could crash, even though there was no user data, hence also no reason, for a drive to jump to the second layer. Therefore it is proposed for a multilayer rewritable disc to have all layers written by the same amount, i.e. at least corresponding to the amount of user data written, in the direction of writing user data, usually from the inner diameter to the outer diameter.

Figure 3:
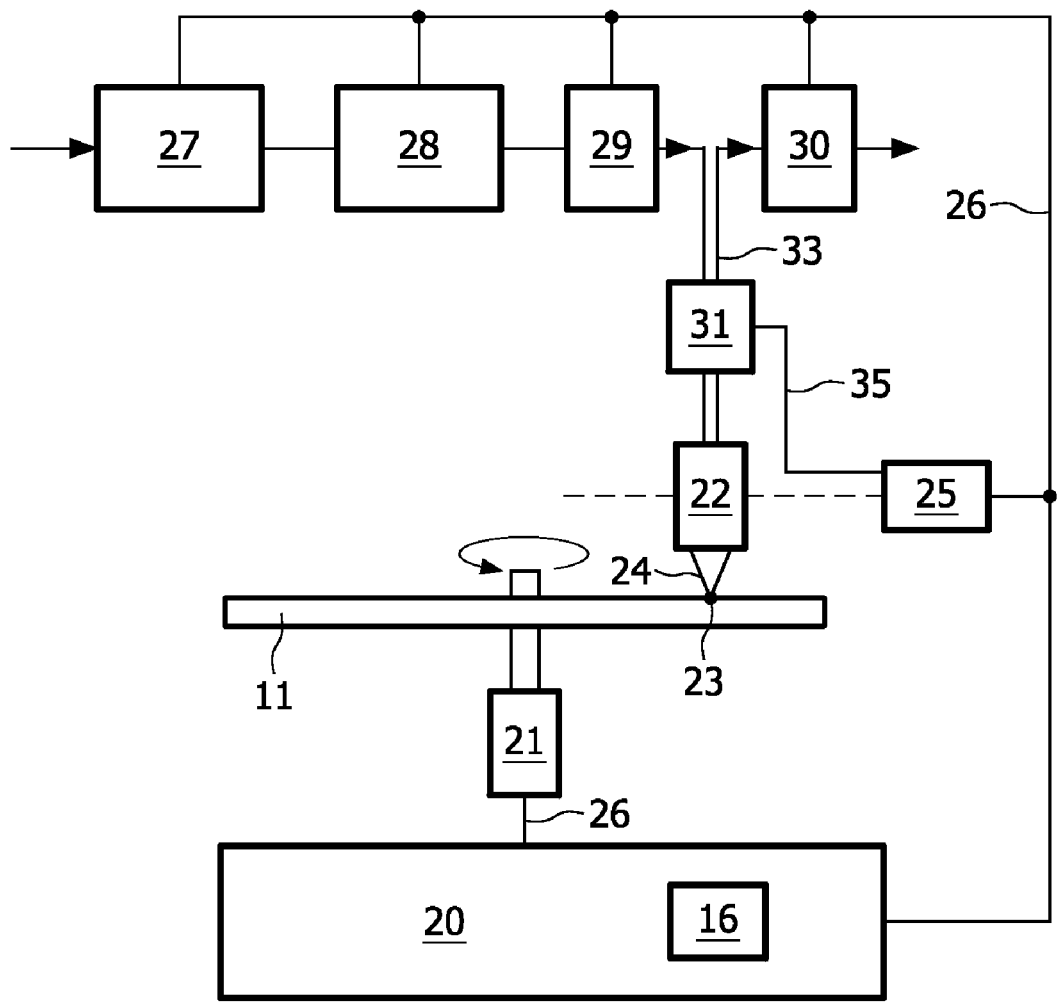
FIG. 3 shows a recording device.

FIG. 3 shows a recording device. The device is provided with scanning means for scanning a track on a record carrier 11 which means include a drive unit 21 for rotating the record carrier 11, a head 22, a servo unit 25 for positioning the head 22 on the track, and a control unit 20. The head 22 comprises an optical system of a known type for generating a radiation beam 24 guided through optical elements focused to a radiation spot 23 on a track of the information layer of the record carrier. The radiation beam 24 is generated by a radiation source, e.g. a laser diode. The head further comprises (not shown) a focusing actuator for moving the focus of the radiation beam 24 along the optical axis of said beam and a tracking actuator for fine positioning of the spot 23 in a radial direction on the center of the track. The tracking actuator may comprise coils for radially moving an optical element or may alternatively be arranged for changing the angle of a reflecting element. The focusing and tracking actuators are driven by actuator signals from the servo unit 25. For reading the radiation reflected by the information layer is detected by a detector of a usual type, e.g. a four-quadrant diode, in the head 22 for generating detector signals coupled to a front-end unit 31 for generating various scanning signals, including a main scanning signal 33 and error signals 35 for tracking and focusing. The error signals 35 are coupled to the servo unit 25 for controlling said tracking and focusing actuators. The main scanning signal 33 is processed by read processing unit 30 of a usual type including a demodulator, deformatter and output unit to retrieve the information. The control unit 20 comprises control circuitry, for example a microprocessor, a program memory and control gates. The control unit 20 may also be implemented as a state machine in logic circuits.

The device is provided with recording means for recording information on a multi-layer record carrier of a writable or re-writable type. The recording means comprise an input unit 27, a formatter 28 and a laser unit 29 and cooperate with the head 22 and front-end unit 31 for generating a write beam of radiation. The formatter 28 is for adding control data and formatting and encoding the data according to the recording format, e.g. by adding error correction codes (ECC), synchronizing patterns, interleaving and channel coding. The formatted units comprise address information and are written to corresponding addressable locations on the record carrier under the control of control unit 20. The formatted data from the output of the formatter 28 is passed to the laser unit 29 which controls the laser power for writing the marks in a selected layer.

In an embodiment the recording device is a storage system only, e.g. an optical disc drive for use in a computer. The control unit 20 is arranged to communicate with a processing unit in the host computer system via a standardized interface. Digital data is interfaced to the formatter 28 and the read processing unit 30 directly.

In an embodiment the device is arranged as a stand alone unit, for example a video recording apparatus for consumer use. The control unit 20, or an additional host control unit included in the device, is arranged to be controlled directly by the user, and to perform the functions of the file management system. The device includes application data processing, e.g. audio and/or video processing circuits. User information is presented on the input unit 27, which may comprise compression means for input signals such as analog audio and/or video, or digital uncompressed audio/video. Suitable compression means are for example described for audio in WO 98/16014-A1 (PHN 16452), and for video in the MPEG2 standard. The input unit 27 processes the audio and/or video to units of information, which are passed to the formatter 28. The read processing unit 30 may comprise suitable audio and/or video decoding units.

The control unit 20 comprises a formatting unit 16 for performing a formatting function on a multilayer record carrier as described below with reference to FIGS. 4 and 5. It is noted that the formatting functions may alternatively, or at least partly, be performed in a different processing unit, e.g. in a host computer via a software driver.

A number of functions of the recording device may be defined according to a predefined standard. For example, formatting an optical record carrier is known from a draft proposal of the National Committee for Information Technology Standards (NCITS): Working Draft, T10/1675-D, Revision 1, 11 Oct. 2004, "INFORMATION TECHNOLOGY—Multimedia Commands MMC-5" (in this document further called MMC-5). In MMC-5, it is required to format a DVD+RW disc before user data may be written to it. A format command may be given according to the known protocol as defined in MMC-5. According to the format a user data zone is created, preceded by a lead-in control zone. After the data zone following the lead-in control zone, a further control zone, usually called lead-out, may be recorded at the end boundary of the data zone.

Further functions are defined in the well-known ATA/ATAPI standard described in MMC-5 (chapter 1) and in NCITS T13/1321D AT Attachment with Packet Interface 5 (ATA/ATAPI-5) referenced in MMC-5 (chapter 2.1.2). Such a recording device may be called an ATA/ATAPI device.

In general a blank disc must be formatted in order for a DVD-ROM drive to read it. When a FORMAT command is given, the device may start the actual format process, e.g. by writing a lead-in control zone. Whether this command, and its underlying process, must be completed immediately depends on the specific format command. If formatting must be immediately completed, the drive will occupy the ATA bus until the lead-in has been fully formatted. However, usually the format command does not specifically require de-icing. The de-icing may be triggered by the format command, or may be initiated by the recording device on its own motion. In general de-icing may be performed as a background process under the control of the recording device, i.e. independently of receiving commands. The de-icing proceeds, while the device also accepts and executes commands to record or retrieve user data on the record carrier, which temporarily interrupts the de-icing.

The main focus of this invention is on formatting of a multilayer record carrier, in particular on the process of de-icing. The formatting means 16 are arranged for de-icing a multilayer record carrier as follows. A first radial position and a first layer are determined, where user data is, or usually will be, recorded first. Hence the first radial position is indicative of a location on the first layer on which user data will be recorded first, which location is selected according to the predefined recording format. If user data has already been recorded, the actual position of the user data may be used. Subsequently the writing of dummy data for the de-icing is started on a second layer of the record carrier at the first radial position. In practice the writing may start before and terminate after said first radial position, and proceed in blocks. Obviously, if some data has already been recorded on further locations on the record carrier, such locations are skipped when writing dummy data. In an embodiment status information is maintained indicating which areas of the record carrier have already been written. Such status information may be generated for a partly recorded record carrier, e.g. by retrieving information from a file management system, or, in the event of formatting a record carrier that has been used before, by scanning the surface of the record carrier.

In an embodiment for a multilayer record carrier, the medium may have a pattern of tracks that is opposite on adjacent layers, called an opposite track path record carrier. For example a dual layer disc having opposite track path may have, on the first layer called L0, a lead-in zone as a first control zone at a minimum radial position constituting the inner physical boundary of the recordable area. On the second layer called L1, a first control zone called the lead-out zone is recorded on the corresponding radial position at the inner physical boundary, which now terminates the data zone on L1.

Figure 4:
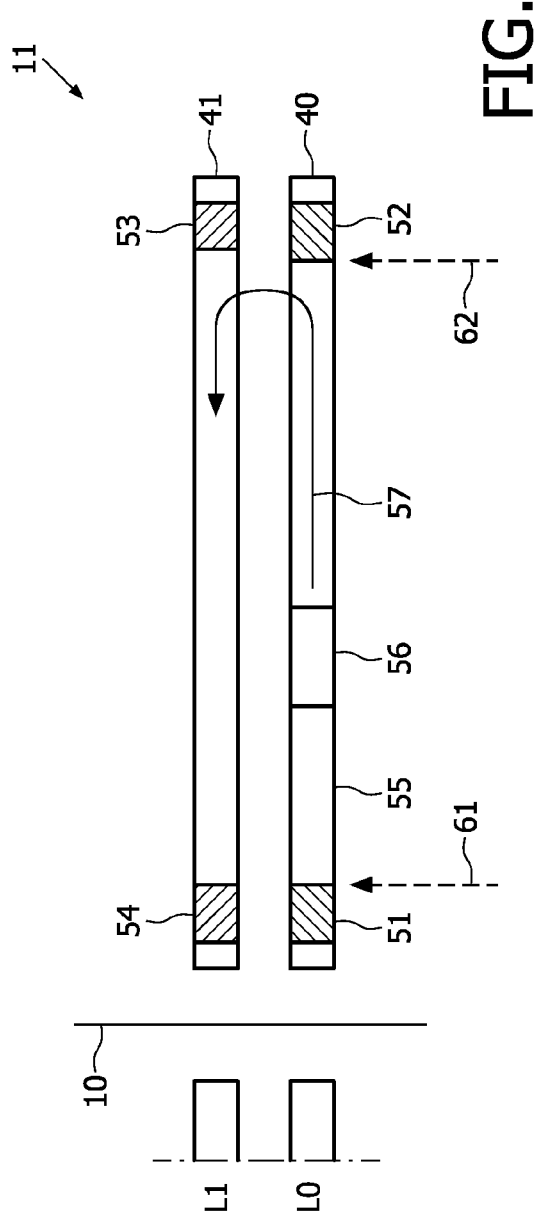
FIG. 4 shows recording on an opposite track path record carrier.

FIG. 4 shows recording on an opposite track path record carrier. A first layer 40, usually called L0 and a second layer 41, called L1 are shown radially centered with respect to the central hole 10. The L0 layer has a first control zone 51 recorded at a first radial position 61 on the L0 layer and a second control zone 52 at a second radial position 62 on the L0 layer. The L1 layer has a first control zone 54 recorded at the first radial position 61 and a second control zone 53 at the second radial position 62. Between both control zones on each layer an annular data zone is formed, which has a data size determined by said radial positions. It is assumed that the track direction on both layers is opposite. In that case the first control zone 51 on the L0 layer is usually called lead-in zone, while the first control zone 54 on the L1 layer is usually called lead-out zone. Further zones which intermediately end or start layers, may be called middle zones. In a multilayer record carrier having a same track direction in each layer the layers may constitute independent user data zones, or may also be combined to a single, logically contiguous, data zone. It is noted that said control zones may be recorded before or after recording further control data, in particular said de-icing may already commence before recording the control zones.

A user data file 55 is indicated as recorded area. According to a traditional de-icing strategy, a first dummy data for de-icing a blank surface, would be written in next area 56 adjacent to the user data file 55. Further dummy data would be recorded as contiguous sequence. After completing L0, the sequence would continue on the further layers in the order of the track direction and the logical addresses, as indicated by arrow 57. Note that formatting of a single layer disc proceeds always from the lowest logical address to the highest address. The logical thing to do on a multilayer disc would also be to format from the lowest to the highest address, as indicated by arrow 57.

Figure 5:
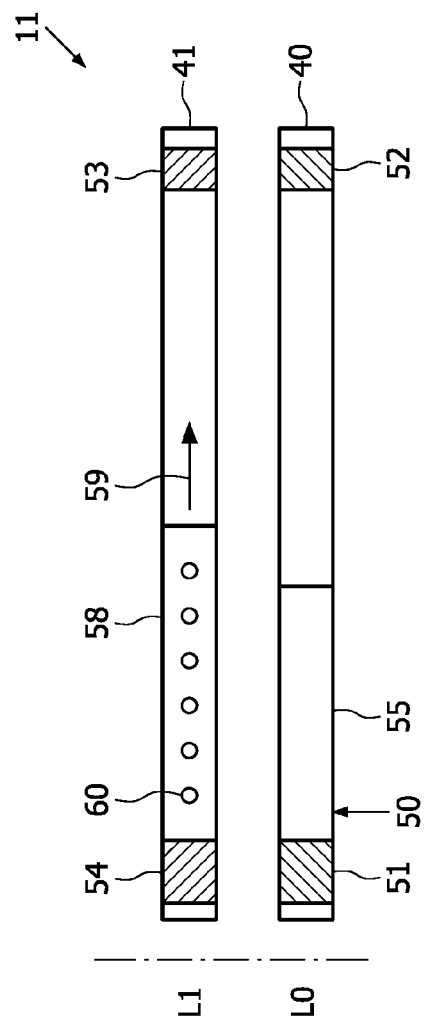
FIG. 5 shows a background formatting strategy.

FIG. 5 shows multilayer background formatting on an opposite track path record carrier. Like in FIG. 4, a first layer 40, and a second layer 41 are shown, the L0 layer having a first control zone 51, the lead-in zone, and a second control zone 52. The L1 layer has a first control zone 54, the lead-out zone, and a second control zone 53. A user data file 55 is indicated as recorded area. Note that an arrow 50 at a first radial position indicates the initial location for first recording user data, which is near the inner boundary of the annular recordable area, just adjacent to the lead-in zone.

According to a novel multilayer de-icing strategy, a first dummy data unit 60 is written at the first radial position 50 for de-icing the blank surface of the L1 layer. A number of dummy data units have been written on L1 in a direction indicated by arrow 59 opposite to the track direction. It is to be noted that, as usual, the writing of a data has to be performed in the direction of the track, which on L1 of a dual layer OTP disc proceeds inwards from the outer diameter. However, arrow 59 indicates that subsequent dummy units are recorded on positions further outwards, i.e. each time starting at an address in the track that precedes the previous dummy unit, and writing the area up to the previous starting address with dummy data. After writing said area the recording head has to jump backwards to the next staring address. Hence a de-iced area 58 is created opposite the user data file 55, and dummy data is recorded as contiguous sequence, continuing on L1 as indicated by arrow 59. Note that on a multilayer record carrier having more than 2 layers the further layers would subsequently be written to create coplanar de-iced areas on each layer.

The new multilayer de-icing strategy achieves that, on a DVD+RW DL disc, which is not yet fully written to L0 size on L0, the area written on L1 is always equal to or larger than the area written on L0. Preferably the written area on L1 is larger by a predetermined amount to make sure that the less capable drive will never hit ice when jumping to a written area on a different layer. The L1 area needs to be written in particular when the disc is ejected, and the de-icing process is interrupted. The partly de-iced multilayer record carrier is called an "intermediate" disc formatted disc, which is still compatible to less capable playback devices.

Figure 6:
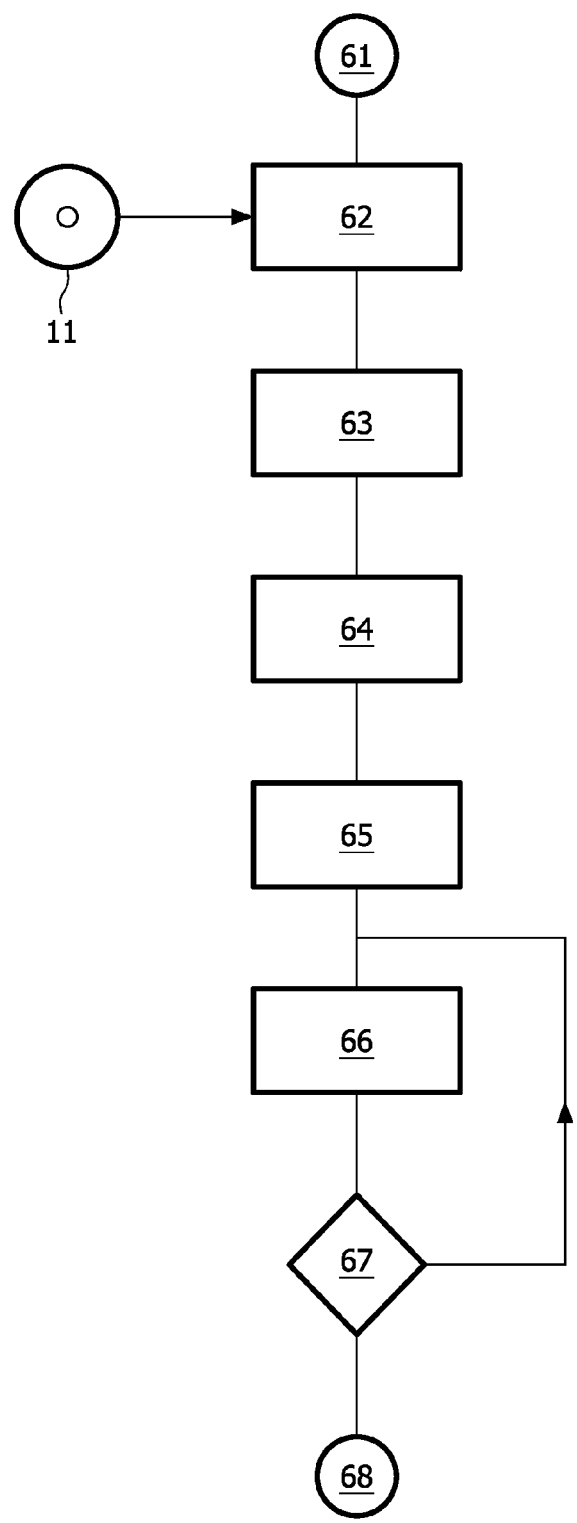
FIG. 6 shows a formatting function of a recording system.

FIG. 6 shows a formatting function of a recording system. The formatting function may be performed in a programmable unit, like a PC or a microprocessor, based on a software program. Alternatively the formatting function may be embedded in a recording device like an optical disc drive. Initially, at START 61, the system is assumed ready for use. In step MOUNT 62 a record carrier 11 is entered, e.g. inserted or activated, and the units for physically accessing the record carrier are activated. In step RECEIVE 63 a command may be received via an interface, e.g. a user interface or an interface to a PC system. It is assumed a format command is received. Next a de-icing process is initiated. In step DETERMINE 64, the recording position of user data that is logically used when first data arrives is determined. In particular, first radial position and a first layer is determined, which first radial position is indicative of a location on the first layer on which user data will be recorded first according to the predefined recording format. Subsequently, at SETPOS 65, the location for starting writing of dummy data on a further layer is set. The location is based on the first radial position, i.e. the location covers the first radial position. At step RECORD DUMMY 66 a unit of dummy data is recorded. At step NEXT 67 it is determined if a further dummy data unit is required. If all blank areas have been written the de-icing process is terminated at point READY 68. In step NEXT 67, it is decided to return to step RECORD DUMMY 66 if further dummy units need to be written. A next location to be written is set according to the de-icing strategy, for example as described now.

Figure 7:
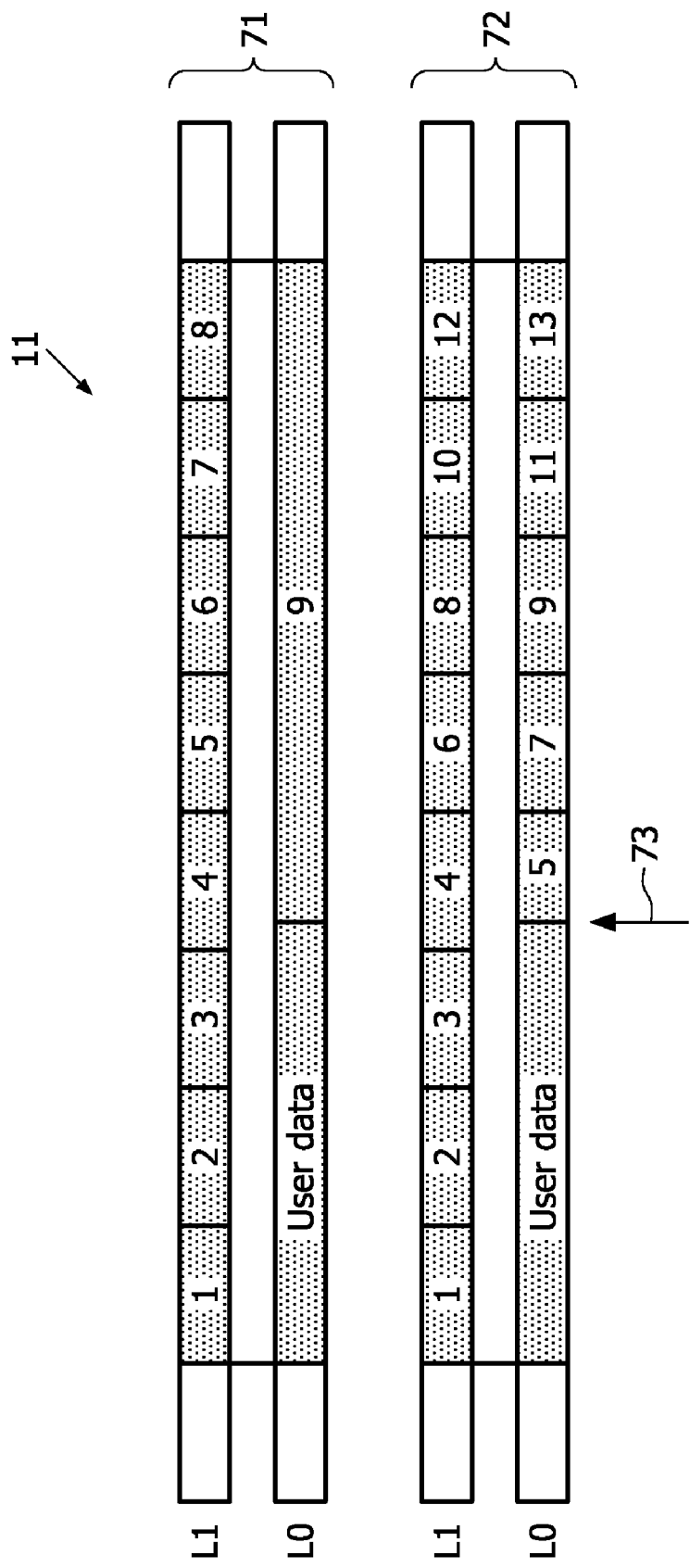
FIG. 7 shows a background formatting strategy.

FIG. 7 shows a background formatting strategy. A first example 71 of the formatting strategy is given in the upper part of the Figure, and a second example 72 of the formatting strategy is given in the lower part. A multilayer record carrier having a layer L0 and a layer L1, and an area of user data having been recorded on L0, is shown in both examples.

In the first example 71 a sequence of dummy data units (numbered dummy1, dummy2, etc) is given that starts (at dummy1) on L1 opposite the starting point of the user data on L0. Subsequent dummy data units are recorded on L1 in the same direction as user data is recorded on L0. When the layer L1 has been completely de-iced (dummy8), the sequence continues on L0 after the user data (dummy9).

In the second example 72 a different sequence of dummy data units is given that starts (at dummy1) on L1 opposite the starting point of the user data on L0, but continues only up to a location covering a third radial position 73 (at dummy4). The third radial position marks the end of the user data already having been recorded. Subsequent dummy data units are alternatingly recorded on L0 and L1 in the same direction as user data is recorded on L0. The next dummy data (dummy5) may be recorded on L0 adjacent to the user data that already has been recorded.

Note that in the second example 72 the first dummy data on the L0 layer (dummy5) has been shown to be shorter than the other units for aligning the dummy units into a regular pattern. Such a pattern may be used to easily maintain status information about which areas have already been de-iced. The alternating sequence of recording dummy data units continues until both layers are fully de-iced (dummy13).

In an embodiment the formatting unit is arranged for maintaining status information indicating, for each layer of the multilayer record carrier, a size and/or position of a contiguously written area. In particular, such status information is stored for later use when the de-icing process is interrupted, for example in a memory of the recording device. Furthermore, the status information may be recorded on the record carrier itself, e.g. when an eject command is to be executed. When the record carrier is inserted, the formatting means may scan the record carrier for retrieving the status information. In a particular case the size of a contiguously written area at least extending from the first radial position, is maintained.

Although the invention has been mainly explained by embodiments using DVD+RW dual layer optical discs, the invention is also suitable for other multilayer record carriers such as rectangular optical cards, magneto-optical discs, high-density (Blu-ray) discs or any other type of information storage system that has a multilayer record carrier that is to be formatted in annular zones. In particular the number of layers may also be larger than 2. Corresponding control zones providing start and end boundary may then be positioned on each layer, such that the user data zones spatially coincide for the stack of layers. De-icing takes place on each layer at radially corresponding locations, coplanar to user data recorded in any other layer.

It is noted, that in this document the word 'comprising' does not exclude the presence of other elements or steps than those listed and the word 'a' or 'an' preceding an element does not exclude the presence of a plurality of such elements, that any reference signs do not limit the scope of the claims, that the invention may be implemented by means of both hardware and software, and that several 'means' or 'units' may be represented by the same item of hardware or software. Further, the scope of the invention is not limited to the embodiments, and the invention lies in each and every novel feature or combination of features described above

The invention claimed is:
1. Device for recording information on a record carrier, the record carrier being of an optically rewritable type, and the device comprising
   scanning means for scanning the record carrier for recording and retrieving data on a layer of the record carrier, and
   formatting means for formatting the record carrier according to a predefined recording format that defines a user data area, which formatting includes de-icing by, in the event that locations in the user data area have not yet been recorded, writing dummy data on the locations,
   the formatting means being arranged for de-icing a multilayer record carrier by:
      determining a first radial position and a first layer, which first radial position is indicative of a location on the first layer on which user data will be recorded first according to the predefined recording format, and starting said writing of dummy data on a second layer of the record carrier at the first radial position, determining a second radial position on the first layer, which second radial position is indicative of an intermediate radial position up to which, on the first layer, user data will be recorded, and writing dummy data on the second layer of the record carrier from the first radial position beyond the second radial position by a predetermined amount, wherein the area written on the second layer is always larger than the area written on the first layer by said predetermined amount.

2. Device as claimed in claim 1, comprising:

the track on the first layer extending in a first direction and the track on the second layer extending in a second direction opposite to the first direction for constituting the user data area having a first part on the first layer, and a second part on the second layer, the formatting means are arranged for said de-icing by determining, as said first radial position, a location adjacent to a starting area preceding said first part in the first direction, and writing said dummy data in dummy units, a first dummy unit being recorded on said second layer at a location adjacent to a terminating area following said second part in the second direction.

3. Device as claimed in claim 2, wherein the formatting means are arranged for said de-icing by writing subsequent dummy units after the first dummy unit on said second layer at a sequence of adjacent positions adjacent to the first dummy unit, the sequence of adjacent positions having a direction opposite to the second direction.

4. Device as claimed in claim 1, wherein the formatting means are arranged for said de-icing by determining a second radial position on the first layer, which second radial position is indicative of a boundary radial position up to which, on the first layer, user data will be recorded according to the predefined recording format, writing dummy data on the second layer of the record carrier from the first radial position up to the second radial position.

5. Device as claimed in claim 1, wherein the formatting means are arranged for said de-icing by writing said dummy, data in dummy units, subsequent dummy units being recorded alternatingly on said first layer and on at least one further layer at a respective sequence of locations adjacent to preceding dummy units, the respective sequence on each layer having the same radial direction.

6. Device as claimed in claim 1, wherein the formatting means are arranged for maintaining status information indicating, for each layer of the multilayer record carrier, at least one of a size or position of a contiguously written area, the formatting means being arranged for recording or retrieving the status information on the record carrier.

7. Device as claimed in claim 1, wherein the device is a video recorder device comprising an input unit for processing video data.

8. Method of formatting a record carrier for recording data and retrieving data, the record carrier being of an optically rewritable type, and the method comprising formatting the record carrier according to a predefined recording format that defines a user data area, which formatting includes de-icing by, in the event that locations in the user data area have not yet been recorded, writing dummy data on the locations, the formatting including de-icing a multilayer record carrier by determining a first radial position and a first layer, which first radial position is indicative of a location on the first layer on which user data will be recorded first according to the predefined recording format, and starting said writing of dummy data on a second layer of the record carrier at the first radial position, determining a second radial position on the first layer, which second radial position is indicative of an intermediate radial position up to which, on the first layer, user data will be recorded, and writing dummy data on the second layer of the record carrier from the first radial position beyond the second radial position by a predetermined amount, wherein the area written on the second layer is always larger than the area written on the first layer by said predetermined amount.

9. A computer program product for formatting a record carrier for recording data and retrieving data, the computer product comprising: a non-transitory computer readable tangible storage medium having computer readable program code embodied therwith, the computer readable program code configured to: cause a processor to perform steps of:

formatting the record carrier according to a predefined recording format that defines a user data area, which formatting includes de-icing by, in the event that locations in the user data area have not yet been recorded, writing dummy data on the locations, the formatting including de-icing a multilayer record carrier by i) determining a first radial position and a first layer, which first radial position is indicative of a location on the first layer on which user data will be recorded first according to the predefined recording format, and ii) starting said writing of dummy data on a second layer of the record carrier at the first radial position iii) determining a second radial position on the first layer, which second radial position is indicative of an intermediate radial position up to which, on the first layer, user data will be recorded, and iv) writing dummy data on the second layer of the record carrier from the first radial position beyond the second radial position by a predetermined amount, wherein the area written on the second layer is always larger than the area written on the first layer by said predetermined amount.

* * * * *